United States Patent
Ito

(10) Patent No.: US 9,426,322 B2
(45) Date of Patent: Aug. 23, 2016

(54) NETWORK DEVICE, CONTROL METHOD, AND STORAGE MEDIUM WITH MANAGEMENT OF A SHARED SETTING VALUE AND A UNIQUE SETTING VALUE FOR EACH NETWORK DEVICE OF A PLURALITY OF NETWORK DEVICES

(71) Applicant: CANON KABUSHIKI KAISHA, Tokyo (JP)

(72) Inventor: Keisuke Ito, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/567,505

(22) Filed: Dec. 11, 2014

(65) Prior Publication Data

US 2015/0189116 A1 Jul. 2, 2015

(30) Foreign Application Priority Data

Dec. 26, 2013 (JP) ................................ 2013-270107
Oct. 14, 2014 (JP) ................................ 2014-209973

(51) Int. Cl.
*H04N 1/00* (2006.01)
*H04N 1/32* (2006.01)

(52) U.S. Cl.
CPC ....... *H04N 1/00973* (2013.01); *H04N 1/00204* (2013.01); *H04N 1/00344* (2013.01); *H04N 1/00928* (2013.01); *H04N 1/32496* (2013.01); *H04N 1/32523* (2013.01); *H04N 2201/007* (2013.01); *H04N 2201/0094* (2013.01)

(58) Field of Classification Search
CPC .................................................. H04N 1/00973
USPC ................................................ 358/1.15, 1.13
See application file for complete search history.

(56) References Cited

U.S. PATENT DOCUMENTS

| | | | | |
|---|---|---|---|---|
| 5,857,073 A * | 1/1999 | Tsukamoto | .......... | G06Q 10/107 709/208 |
| 2009/0238213 A1 * | 9/2009 | Kasatani | ............ | H04N 1/00344 370/503 |
| 2011/0320952 A1 * | 12/2011 | Kataoka | .............. | H04L 41/0253 715/735 |
| 2015/0178030 A1 * | 6/2015 | Kasahara | .............. | G06F 3/1268 358/1.15 |

FOREIGN PATENT DOCUMENTS

JP 4678276 B2 4/2011

* cited by examiner

*Primary Examiner* — Jacky X Zheng
(74) *Attorney, Agent, or Firm* — Fitzpatrick, Cella, Harper & Scinto

(57) ABSTRACT

A network device communicates with a management server that manages a shared setting value and an individual setting value as a master data. The network device includes a first receiving unit configured to receive a first instruction associated with an input from a user for the shared setting value; a second receiving unit configured to receive a second instruction indicating an initialization processing; a first requesting unit configured to make a request to the management server in accordance with the first instruction; a second requesting unit configured to request for the management server in accordance with the second instruction; an executing unit configured to execute the initialization processing in accordance with the second instruction; a query unit configured to perform a query for the management server; and a modifying and reflecting unit configured to modify and reflect the shared setting value.

9 Claims, 16 Drawing Sheets

FIG. 5A

| Key identifier | UI display word | Initial value | Value range | Applicable model/ Firmware version | Display condition |
|---|---|---|---|---|---|
| settings.pattern | Woven pattern printing | 0 | 0-1 | Model A/ALL Model B/ALL Model C/V3.01 Later | Woven pattern license |
| settings.density | Printing concentration | 5 | 0-10 | Model A/ALL Model B/2.01 Later | – |
| settings.density | Printing concentration | 3 | 0-6 | Model A/1.99 Earlier Model C/ALL | – |
| ... | | | | | |

FIG. 5B

| Key identifier | Value | Final update date and time |
|---|---|---|
| settings.pattern | 0 | 2013/9/9/12:01 |
| settings.density | 6 | 2013/9/8/17:35 |
| ... | | |

FIG. 5D

| Attribute | Value |
|---|---|
| Individual identifier | Individual 1 |
| Model name | Model A |
| Firmware version | 0.01 |
| Installed license | Woven pattern license |
| Accessory | Finisher-X |

FIG. 5C

| Key identifier | Value | Final update date and time |
|---|---|---|
| settings.pattern | 1 | 2013/5/9/18:42 |
| settings.density | 4 | 2013/6/18/17:12 |
| ... | | |

FIG. 6

| Key identifier | Value | UI display word | Initial value | Value range | Display condition |
|---|---|---|---|---|---|
| settings.pattern | 1 | Woven pattern printing | 0 | 0-1 | Woven pattern license |
| settings.density | 4 | Printing concentration | 5 | 0-10 | - |
| ... | | | | | |

601

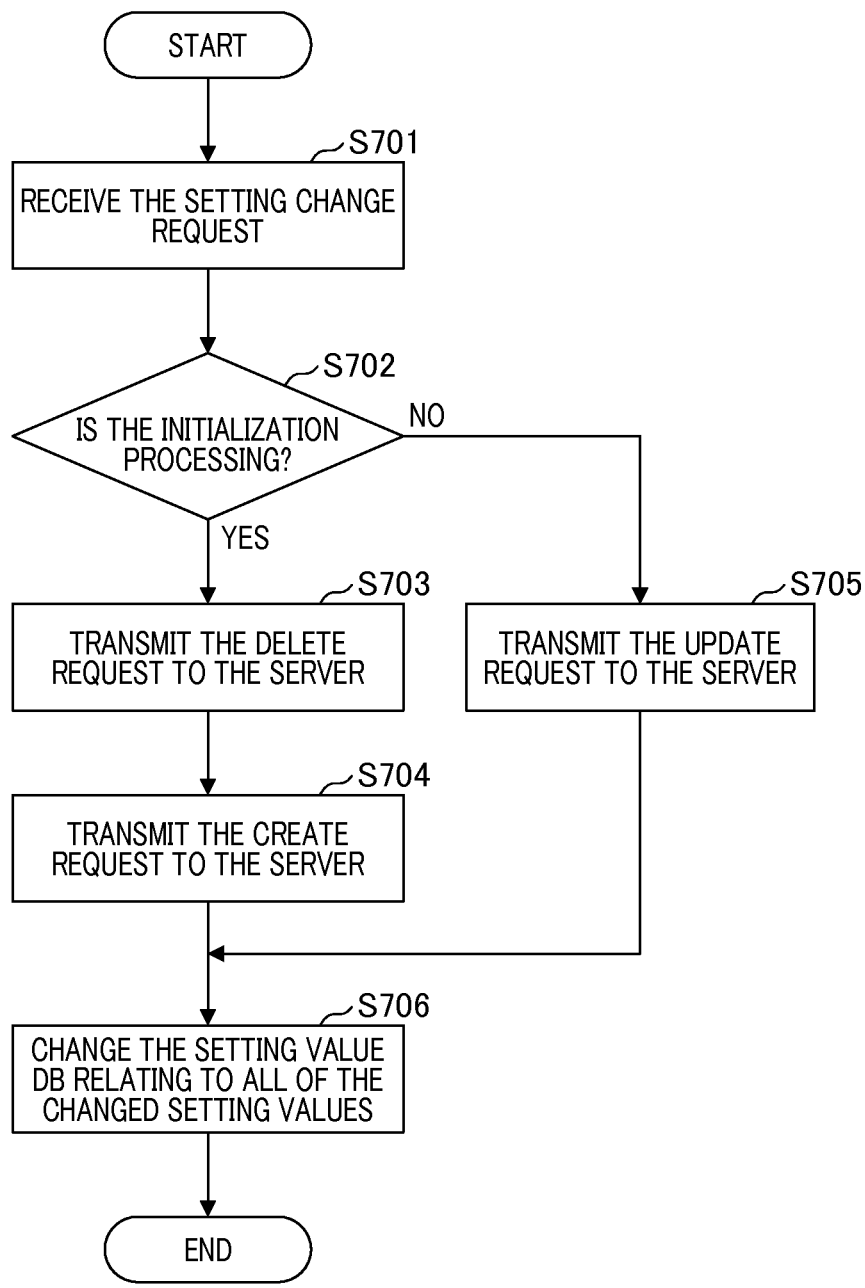

FIG. 13A

| User ID | User name | First name | Last name |
|---|---|---|---|
| 501 | sato | Takashi | Sato |
| 502 | ii | Yoshiko | Ii |
| ... | | | |

FIG. 13B

| User ID | Key identifier | Value | Final update date and time |
|---|---|---|---|
| 501 | preference.print_setting1 | {colormode: "BW", copies: "3"} | 2013/2/4/2:01 |
| 501 | preference.print_setting2 | {colormode: "CL", quality: "low"} | 2013/2/3/7:35 |
| 501 | preference.address1 | {destination: "sato@canon.com"} | 2013/8/30/3:01 |
| 501 | preference.address2 | {destination: "user1@canon.com"} | 2013/1/13/2:16 |
| ... | | | |

NETWORK DEVICE, CONTROL METHOD, AND STORAGE MEDIUM WITH MANAGEMENT OF A SHARED SETTING VALUE AND A UNIQUE SETTING VALUE FOR EACH NETWORK DEVICE OF A PLURALITY OF NETWORK DEVICES

BACKGROUND OF THE INVENTION

1. Field of the Invention

The present invention relates to a network device, a control method, and a storage medium.

2. Description of the Related Art

Recently, master data for setting values of an information apparatus such as a multifunction device (a network device) is stored in another information apparatus such as a management server communicated with network in order to be managed centrally. These values are synchronized, and if the value of the master data on the management server has been changed, the changed value is reported to the multifunction device and a value of the setting value within the multifunction device is also changed. Similarly, if the value of the setting value within the multifunction device is changed, the value of the setting value on the management server is also changed. Also a setting value that is synchronized between the plurality of multifunction devices is present, and if the value of the setting value is changed, the master data on the server and the value of the setting value within all of the multifunction devices to be synchronized is changed.

Japanese Patent No. 4678276 discloses a technique in which, for specific data in a device, a standard value is managed on a server and the standard value is modified and reflected in the data in the device on the server (a setting value is initialized).

However, in Japanese Patent No. 4678276, if the setting value is initialized, the values of all setting values to be initialized may be modified and reflected in the master data on the server. In this case, if a setting value which is initialized between the plurality of multifunction devices is present among the setting values, the setting value in other multifunction devices may be rewritten.

SUMMARY OF THE INVENTION

The present invention provides a network device that, if an initialization instruction is performed, a value of master data on a server is changed only for a setting value which is not synchronized between a plurality of multifunction devices. Also, in a system for managing the setting value on a network, the present invention provides a control method for the network device that flexibly manages the setting value if an initialization processing is performed on any of the multifunction devices.

According to an embodiment of the present invention, a network device that communicates with a management server that manages a shared setting value to be set on a plurality of network devices and an individual setting value to be set on each network device as master data is provided that includes a first receiving unit configured to receive a first instruction indicating a change of a setting value associated with an input from a user for the shared setting value; a second receiving unit configured to receive a second instruction indicating an initialization processing for restoring a plurality of setting values including the shared setting value to an initial value; a first requesting unit configured to make a request for modifying and reflecting the change of the setting value according to the first instruction in the master data for the management server in accordance with the first instruction; a second requesting unit configured to request changing an item different from an item corresponding to the shared setting value to the initial value for the management server in accordance with the second instruction; an executing unit configured to execute the initialization processing for a database managed by the network device in accordance with the second instruction; a query unit configured to query about the setting value to be set on the network device in accordance with the master data for the management server; and a modifying and reflecting unit configured to modify and reflect the shared setting value, which is managed as the master data and is acquired from the management server in accordance with the query, for the database managed by the network device.

According to the present invention, a network device can be provided in which, if an initialization instruction is performed, a value of master data on a server is changed only for a setting value that is not synchronized between a plurality of multifunction devices. Also, in a system for managing the setting value on a network, a control method of the network device can be provided for flexibly managing the setting value if an initialization processing is performed on any of the multifunction devices.

Further features of the present invention will become apparent from the following description of exemplary embodiments with reference to the attached drawings.

BRIEF DESCRIPTION OF THE DRAWINGS

FIGS. 5A to 5D are diagrams illustrating the configuration of a database included in the master data.

FIG. 6 is a diagram illustrating the configuration of a setting value DB stored in a HDD of the multifunction device.

FIG. 7 is a flowchart illustrating processing performed when the multifunction device receives a change request of setting value.

FIGS. 13A and 13B are diagrams illustrating the configuration of the database included in the master data.

DESCRIPTION OF THE EMBODIMENTS

Hereinafter, preferred embodiments of the present invention will be described with reference to the drawings.

First Embodiment

Figure 1:
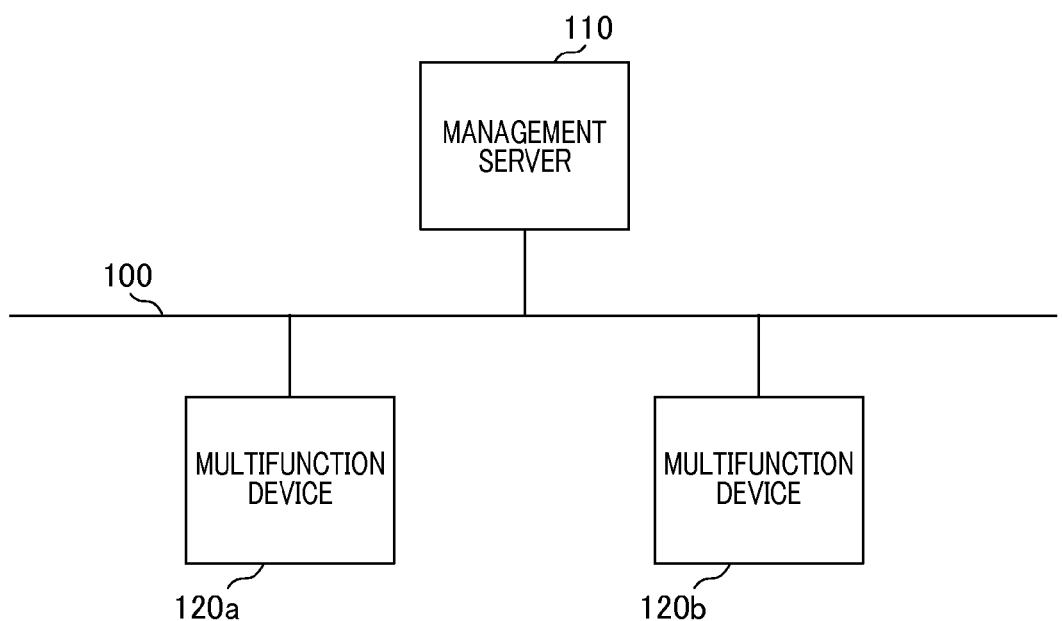
FIG. 1 is a diagram illustrating a system configuration of a setting value synchronization system.

FIG. 1 is a diagram illustrating a system configuration of a setting value synchronization system according to the present invention. A management server 110 and multifunction devices 120a and 120b are connected to a network 100. The management server 110 manages master data of setting values of the multifunction devices 120a and 120b. If the master data is changed, change information is reported to the multifunction devices 120a and 120b via the network 100. If the management server 110 receives the change information of the setting value from the multifunction devices 120a and 120b, the management server 110 changes the master data thereof.

The multifunction devices 120a and 120b are devices (network devices) that realize a plurality of types of functions (copying, FAX, and the like) and store setting values used while performing these functions therein. If the setting values are changed, the multifunction devices 120a and 120b notify the management server 110 about the change information via the network 100. If the multifunction devices 120a and 120b receive the change information of the master data from the management server 110, the multifunction devices 120a and 120b change the setting values thereof. Note that a synchronization of value may be performed between a plurality of multifunction devices such as the multifunction devices 120a and 120b depending on the setting value.

If the setting value of the master data on the management server 110 is changed, both of the multifunction devices 120a and 120b are notified about the change information. If the setting value of one of the multifunction devices 120a and 120b is changed, firstly, the other multifunction devices are notified about the change information is notified to the management server 110 and then other multifunction devices are also notified about the change information by the management server via the network 100. A detailed description of the management server and the multifunction devices 120a and 120b will be described below.

Figure 2:
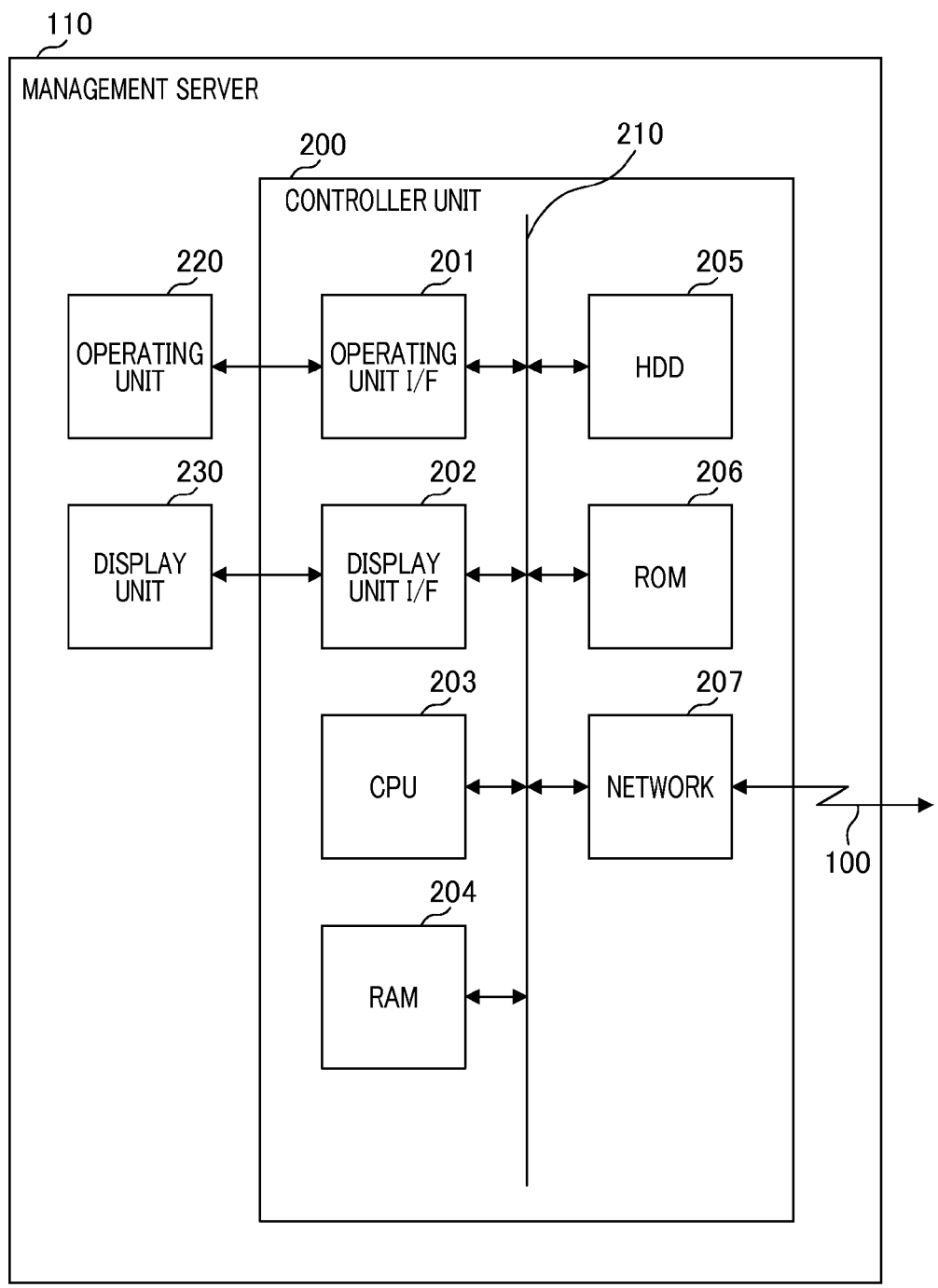
FIG. 2 is a block diagram illustrating the configuration of a management server.

FIG. 2 is a block diagram illustrating the configuration of the management server 110 according to the present embodiment. The management server 110 comprises a controller unit 200, an operation unit 220, and a display unit 230. The controller unit 200 includes a CPU (Central Processing Unit) 203. The CPU 230 is a processor for controlling a whole system and activates an OS (Operating system) by a boot program stored in a ROM (Read Only Memory) 206.

The CPU 203 performs an application program stored in a HDD (Hard Disk Drive) 205 on the OS to perform the various processing. A RAM (Read Access Memory) 204 is used as a working area of the CPU 203. The HDD 205 stores the above application program, the master data of the setting values of the multifunction devices 120a and 120b, and the like. A detailed description of a management method of the master data will be described below.

The CPU 203 is connected to an operation unit I/F 201, a display unit I/F 202, and a network 207, along with the ROM 206 and the RAM 204, via a system bus 210. The operation unit I/F 201 is an interface with the operation unit 220 consisting of a mouse, a keyboard, or the like, and transmits information input by a user using the operation unit 220 to the CPU 203. The display unit I/F 202 outputs image data to be displayed on the display unit 230 consisting of a display or the like to the display unit 230. The network 207 is connected to the network 100 and inputs and outputs the information between the devices on the network 100 via the network 100.

Figure 3:
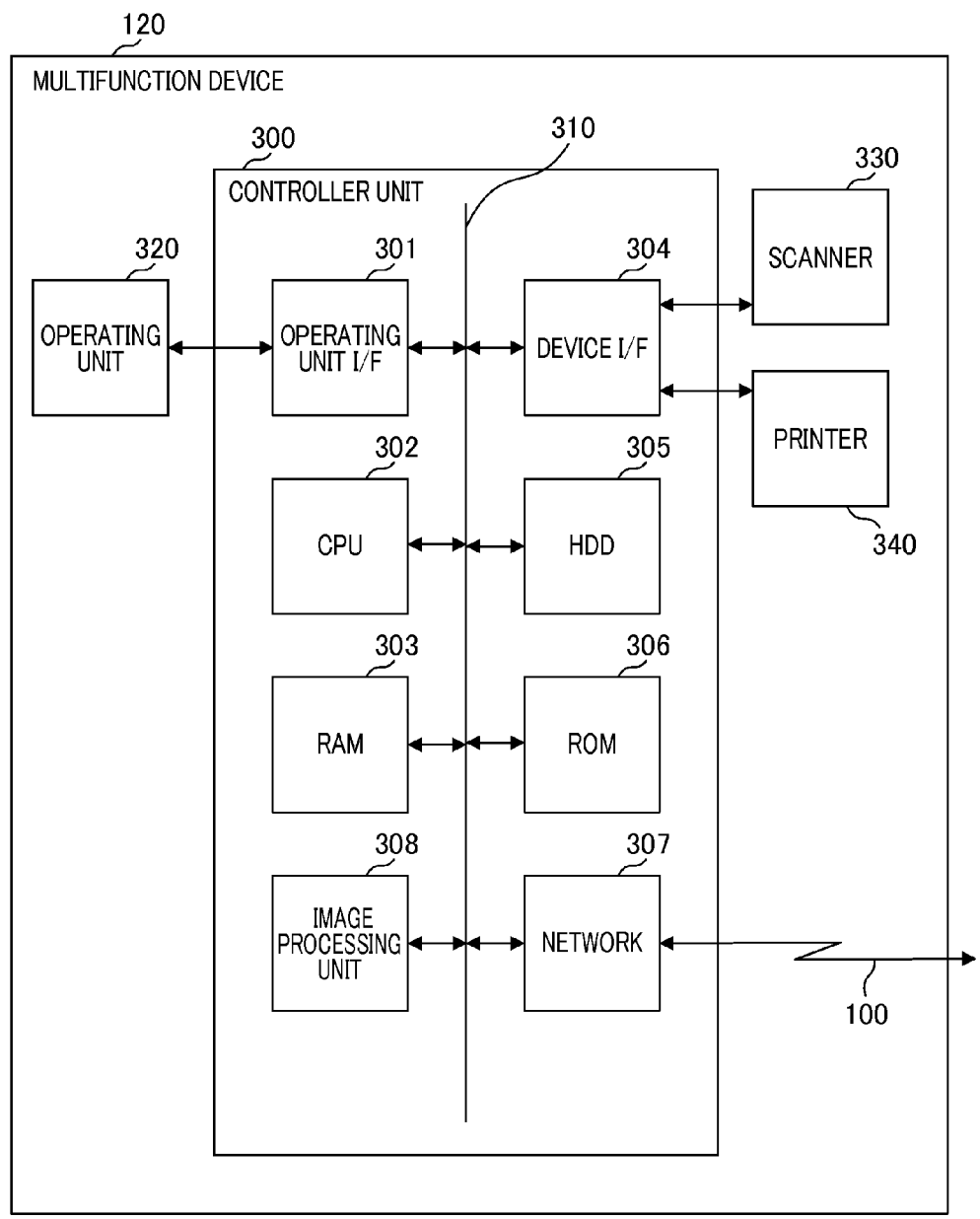
FIG. 3 is a block diagram illustrating the configuration of a multifunction device.

FIG. 3 is a block diagram illustrating the configuration of the multifunction device 120 according to the present embodiment. The multifunction device 120 includes a controller unit 300, an operation unit 320, scanner 330, and a printer 340. The controller unit 300 is connected, along with the operating unit 320, to the scanner 330, which is an image input device, and the printer 340, which is an image output device.

The controller unit 300 includes a CPU 302, and the CPU 302 actives the OS by the boot program stored in a ROM 306. The CPU 302 performs an application program stored in a HDD 305 on the OS to perform the various processes. A RAM 303 is used as the working area of the CPU 302. The RAM 303 provides the working area and an image memory area for temporarily storing image data. The HDD 305 stores the above application, the image data, and various setting values. A detailed description of a management method of the setting values in the multifunction device 120 will be described below.

The CPU 302 is connected, along with the ROM 306 and the RAM 303, to an operation unit I/F 301, a device I/F 304, and a network 307 via a system bus 310. The operation unit I/F 301 is the interface with the operation unit 320 having a touch panel or the like, and transmits image data to be displayed on the operating unit 320 to the operating unit 320. The operating unit I/F 301 outputs the information input by the user using the operating unit 320 to the CPU 302.

The device I/F 304 is connected to the scanner 330 and the printer 340 and performs synchronous/asynchronous conversion of the image data. The network 307 is connected to the network 100 and inputs and outputs the information between the devices on the network 100 via the network 100. An image processing unit 308 performs input image processing from the scanner, output image processing to the printer, and processing such as image rotation, image compression, resolution conversion, color space conversion, gradation conversion, and the like.

Figure 4:
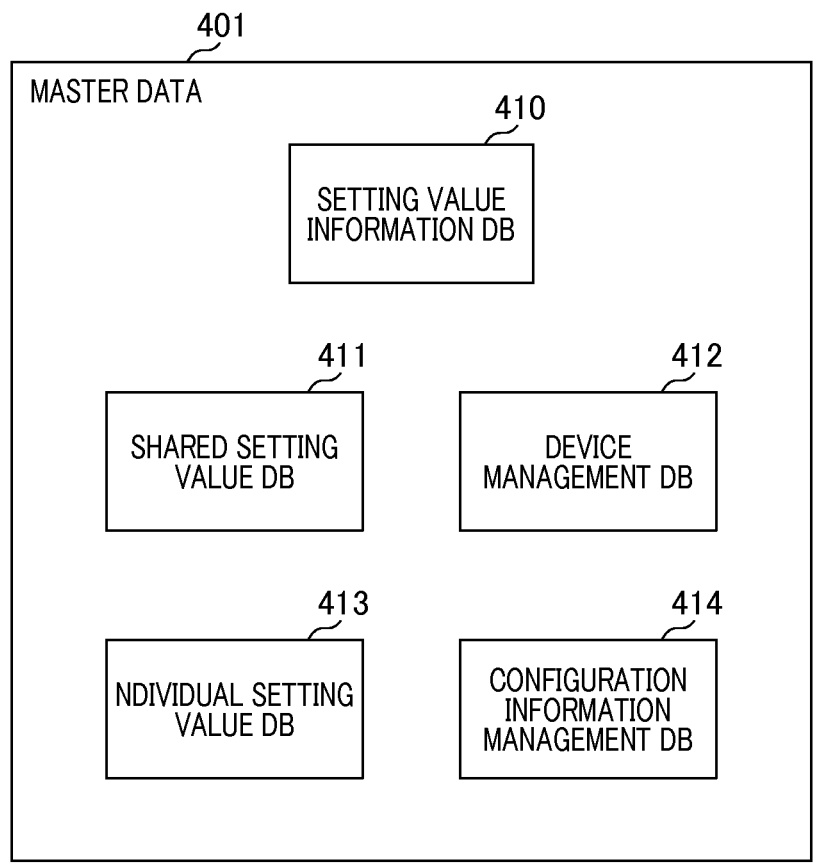
FIG. 4 is a block diagram illustrating master data managed by the management server.

FIG. 4 is a block diagram illustrating the master data managed by the management server 110. Master data 401 consists of setting value information DB 410, a shared setting value DB 411, a device management DB 412, an individual setting value DB 413, and a configuration information management DB 414.

FIG. 5A is a diagram illustrating data stored in the setting value information DB 410. The setting value information DB 410 is a database storing metadata about various setting values managed by the management server 110. A word presented to the user, a key identifier that allows identifying the setting value while performing communication with the multifunction device 120, an initial value, a value range, an adaptive model/version, and a display condition of the setting value. Each of the setting values managed in the setting value information DB 410 may have different value ranges for the setting values and the initial values depending on the model or firmware version of the multifunction device 120.

FIG. 5A illustrates that the setting value for which the key identifier is represented as "settings.pattern" is present in all individuals in a type A and a type B, but is present only in individuals with firmware version 3.01 or later in a type C. Also, it illustrates that the setting value for which the key identifier is represented as "settings.density" has different setting values or initial values depending on the firmware version installed in the type B.

FIG. 5B is a diagram illustrating data stored in the shared setting value DB 411. The shared setting value DB 411 is a database that manages the setting value synchronized sharing in all of the plurality of multifunction devices 120 for which the setting values are managed by the management server 110. The shared setting value DB 411 stores the key identifier, a value corresponding to the identifier, and the last update date of the setting value. Note that, in the present embodiment, the key identifier is an identifier having the same system as the key identifier of the setting value information DB 410.

FIG. 5C is a diagram illustrating data stored in the individual setting value DB 413. The individual setting value DB 413 is a database that manages the setting values that are different in each of the plurality of multifunction devices 120 of which the setting value is managed by the management server 110. Note that there are a plurality of individual setting value DBs 413 corresponding to each individual multifunction device. The individual setting value DB 413 stores the key identifier, a value corresponding to the identifier, and the last update date of the setting value. Note that the key identifier is an identifier having the same system as the key identifier of the setting value information DB 410.

FIG. 5D is a diagram illustrating the device information for each of the individual multifunction devices managed by the configuration information management DB 414. The configuration information management DB 414 is a database that stores and manages the plurality of device configuration information. The device configuration information includes the identifier identifying the individual multifunction device 120, the model name, the firmware version, license information indicating available function, and the like. Note that the model name, the firmware version, license, and the like have the same system as the key identifier of the setting value information DB 410.

The device management DB 412 is a database for managing the individual identifier of the individual multifunction device 120 managed by the management server 110. The management server 110 can collectively manage different setting values in each of the multifunction devices 120 that are to be managed, the shared setting values in all of the multifunction devices 120 that are to be managed, and metadata of each setting value itself using each database of the master data 401 as described the above.

FIG. 6 is a diagram illustrating an example of the configuration of a setting value DB 601 stored in the HDD 305 of the multifunction device 120 according to the present embodiment. The setting value DB 601 is a database that stores the setting value used in the multifunction device 120. The setting values stored in the setting value DB 601 consist of the elements such as the key identifier for identifying the setting value, the value of the setting value, UI display words, the initial value, the value range, the display condition, and the like. These elements are managed in the same system as that managed in the master data 401. If the setting value is changed in the management server 110 or the multifunction device 120, at least the key identifier or the value of data shown in FIG. 6 is transmitted to thereby synchronize the setting value.

FIG. 7 is a flowchart illustrating a processing performed by the multifunction device 120 when the user of the multifunction device 120 performs an initialization process for changing the setting value or restoring the value of a specific setting value to the initial value that has been stored in advance. The processing is performed by reading the program from the HDD 305 and deploying to the RAM 303 by the CPU 302 of the multifunction device 120. Firstly, in step S701, the CPU 302 displays an edit screen of the setting value on the operation unit 320 and receives the change request (a first instruction and a second instruction) of the setting value from the user.

Figure 8A:
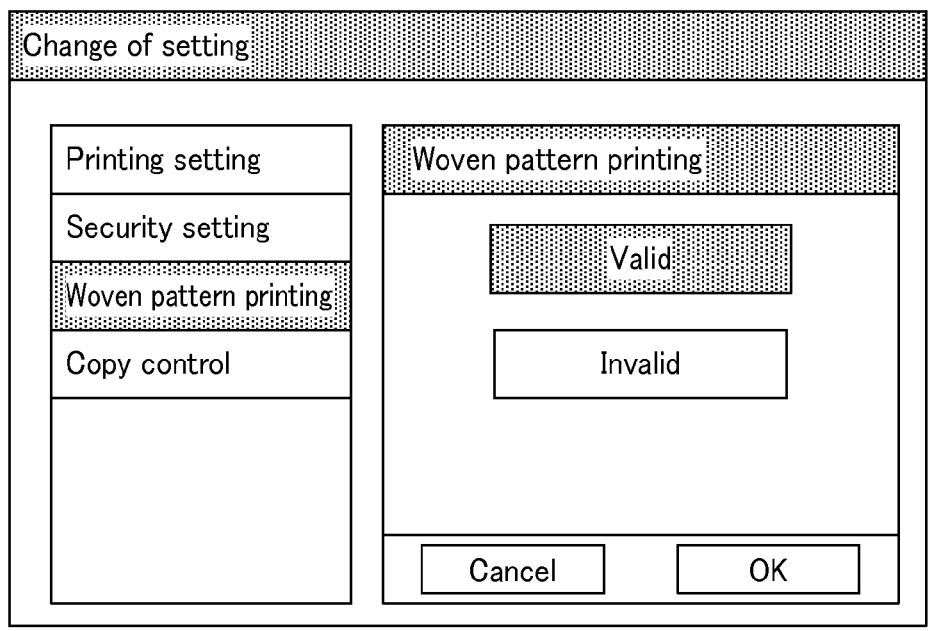
FIGS. 8A and 8B are diagrams illustrating an example of an icon image displayed on an operation unit.

FIG. 8A is a diagram illustrating an example of a normal setting value reception screen displayed on the operation unit 320 by the multifunction device 120 in step S701. In the present embodiment, the screen is a screen for setting value whether to activate a woven pattern function during printing. If the user presses "OK" button after selecting "active" or "inactive" button, the CPU 302 determines the value after changing the setting value based on the content controlled by the operation unit 320.

Figure 8B:
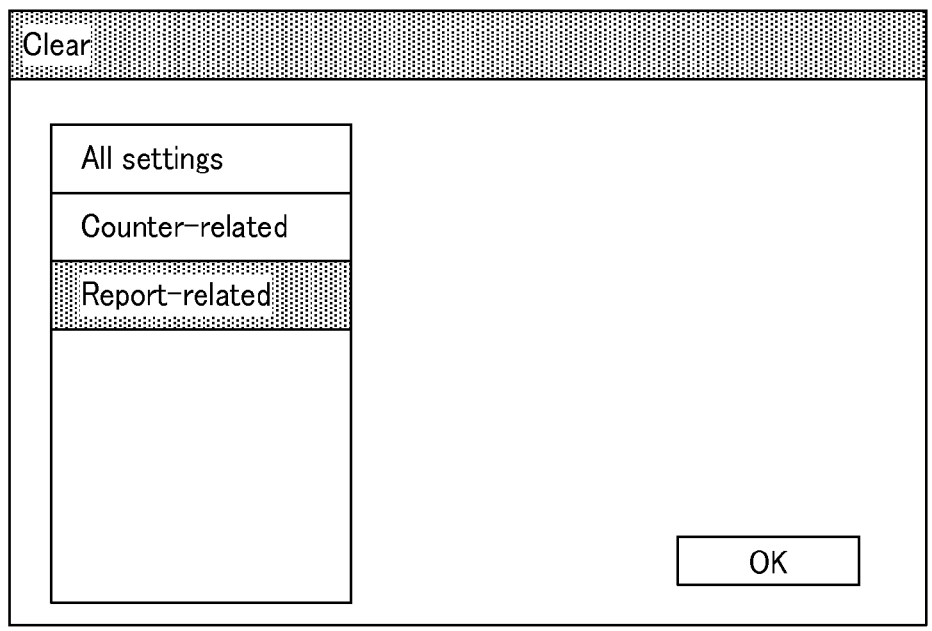

FIG. 8B is a diagram illustrating an example of an initialization processing reception screen displayed on the operation unit 320 by the multifunction device 120 in step S701. Note that the initialization processing is a processing for changing the value of the selected setting value to the initial value which has been stored in the setting value DB 601 in advance. In the present embodiment, the screen is a screen for performing the initialization processing for restoring the setting value belonging to a specific category to the initial value. If the user selects the category and presses the "OK" button, the CPU 302 determines the setting value to be initialized based on the content controlled by the operation unit 320.

Next, restoring to FIG. 7, in step S702, the CPU 302 determines whether or not the changing request of the setting value received in step S701 is the initialization processing. If the changing request is the initialization processing (YES), the processing proceeds to step S703. If the changing request is not the initialization processing (NO), the processing proceeds to step S705.

In step S703, the CPU 302 transmits a DELETE request about the setting value to be initialized to the management server 110. As the method for transmitting the request to the management server 110, a method for transmitting the request with, for example, HTTP (Hypertext Transfer Protocol) is considered. However, if the method is the method for transmitting with a communicable manner via the network, the method is not limited to a specific method. Note that, in the present invention, the request of a CREATE processing as described below is sent after the DELETE processing to the management server 110 in a sequence during the initialization processing.

Next, in step S704, the CPU 302 transmits the CREATE request about the setting value to be initialized to the management server 110. At this time, the CPU 302 also transmits the initial value about all setting values to be processed. In contrast, in step S705, the CPU 302 transmits the UPDATE request about setting value of the normal setting value change target to the management server 110. At this time, the CPU 302 also transmits the value after changing all setting values to be processed. Then, in step S706, the CPU 302 changes the value of the setting value DB 601 relating to all of the changed setting values. Additionally, in step S702, if the CPU 302 determines that the changing request of the setting value is the initialization processing, the CPU 302 changes to the initial value relating to all of the changed setting values. However, the CPU 302 may query the management server 110 about update information of the individual setting value DB 413, acquire the change information if there is the update information, and modify and reflect it in the setting value DB 601 after this processing as described below without limiting the present embodiment.

Figure 9:
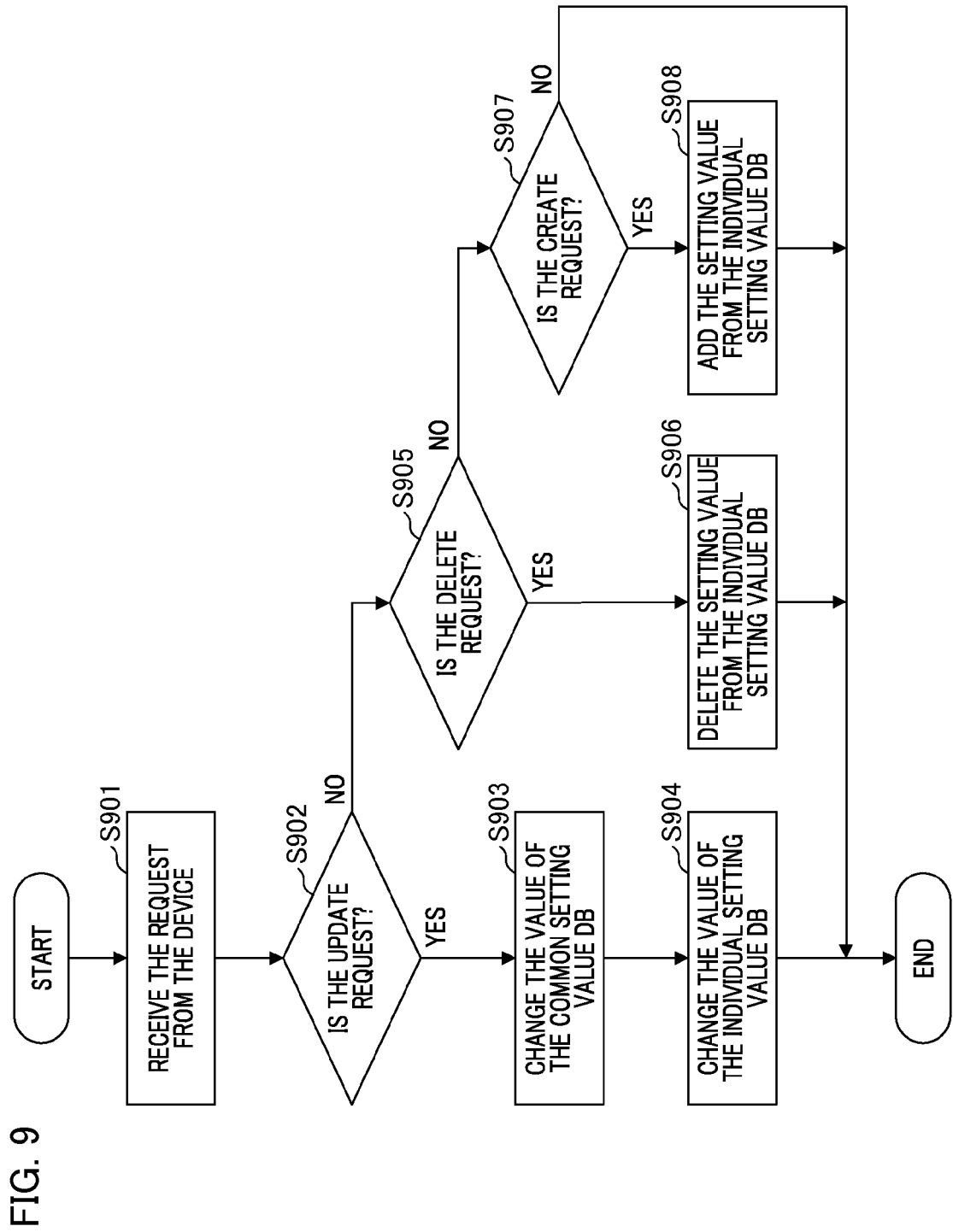
FIG. 9 is a flowchart illustrating processing performed when the management server receives a various requests.

FIG. 9 is a flowchart illustrating an example of a processing performed when the management server 110 receives various requests form the multifunction device 120. In the present invention, the CPU 203 of the management server 110 reads the program from the HDD 205 and deploys it to the RAM 204 for execution.

Firstly, in step S901, the CPU 203 receives the various requests from the multifunction device 120. Next, in step S902, the CPU 203 determines whether or not the request received in step S901 is the UPDATE request. If the request is the UPDATE request (YES), the processing proceeds to step S903. If the request is not the UPDATE request (NO), the processing proceeds to step S905.

In step S903, the CPU 203 rewrites the value based on the received value after changing setting value stored in the shared setting value DB 411 among the setting values of the UPDATE target. Then, in step S904, with respect to setting value stored in the individual setting value DB 413 among the setting values of the UPDATE target, the CPU 203 rewrites the value based on the transmitted value after being changed from the multifunction device 120.

On the other hand, in step S905, the CPU 203 determines whether or not the request received in step S901 is the DELETE request. If the request is the DELETE request (YES), the processing proceeds to step S906. If the request is not the DELETE request (NO), the processing proceeds to step S907. Then, in step S906, the CPU 203 deletes the setting value of the DELETE target from the individual setting value DB 413. At this time, since the setting value stored in the shared setting value DB 411 is not deleted, information about the value of the setting value that is shared and synchronized is not lost.

In contrast, in step S907, the CPU 203 determines whether or not the request received in step S901 is the CREATE request. If the request is the CREATE request, the processing proceeds to step S908. If the request is not the CREATE request, the processing ends. Then, in step S908, the CPU 203 adds the setting value of the CREATE target to the individual setting value DB 413. At this time, as shown in FIG. 7, if the initialization processing is performed in the multifunction devices 120, the DELETE request and the CREATE request are transmitted continuously, and otherwise, the UPDATE request is transmitted. If the DELETE request and the CREATE request are transmitted continuously, the processing from step S901 shown in FIG. 9 is performed twice.

At this time, in relation to the setting value stored in the shared setting value DB 411, the setting value that is stored in the shared setting value DB 411 is adopted and is also set to the individual setting value DB 413. In addition, in relation to the setting value not stored in the shared setting value DB 411, the value of the initial value transmitted from the multifunction device 120 is adopted and is also set to the individual setting value DB 413. Therefore, if the initialization processing is performed, only the setting value values that are not values synchronized between the plurality of multifunction devices can be changed in the individual setting value DB 413.

By performing the above processing, in relation to the individual setting value DB 413, when the initialization processing is performed on the multifunction device 120, the setting value values that are not values synchronized between the plurality of multifunction devices can be prevented from changing. However, in relation to the value of the setting value DB 601 in the multifunction device 120, the setting value values that are not values synchronized between the plurality of multifunction devices has been changed.

The multifunction device 120 not only notifies the management server 110 about the changed content at the time the value of the setting value DB 601 has been changed, but also detects the change of the individual setting value DB 413 in the management server 110 by periodically performing polling (query) to modify and reflect it to the setting value DB 601. With this processing, the setting value in the setting value DB 601, for which the value is temporarily changed and is synchronized between the plurality of multifunction devices, can also be restored to the setting value before performing the initialization processing.

Figure 10:
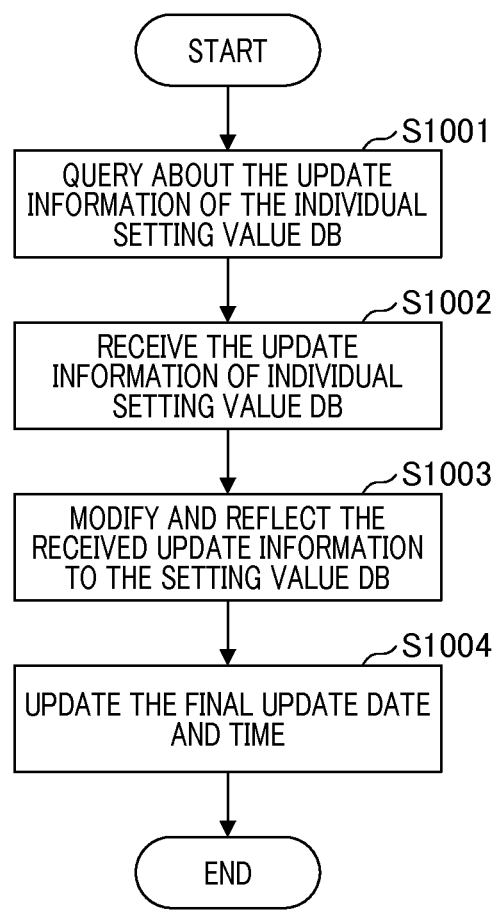
FIG. 10 is a flowchart illustrating processing performed when a change in an individual device setting value DB is reflected for the setting value DB.

Next, FIG. 10 is a flowchart illustrating an example of a process in which the multifunction device 120 performs the polling, detects the change of the individual setting value DB 413, and modifies and reflects the setting value DB 601. In the present embodiment, the CPU 302 of the multifunction device 120 reads the program from the HDD 305 and deploys it to the RAM 303 to for execution. Note that the multifunction device 120 performs the processing as described below periodically at a predetermined time.

Firstly, in step S1002, the CPU 302 queries management server 110 about the update information of the individual setting value DB 413. At this time, the multifunction device 120 transmits a final modification date and time that the change of the individual setting value DB 413 is finally modified in the setting value DB 601. The final modification date and time is stored in the HDD 305.

Next, in step S1002, the CPU 302 receives the changed value relating to all setting values that have been updated in the individual setting value DB 413 after the final modification date and time, that has been sent in step S1001, sent from the management server 110. Next, in step S1003, the CPU 302 modifies the changed value of each setting value acquired by the reception in step S1002 in the setting value BD 601. Then, in step S1004, the CPU 302 updates the final modification date and time stored in the HDD 305.

Figure 11:
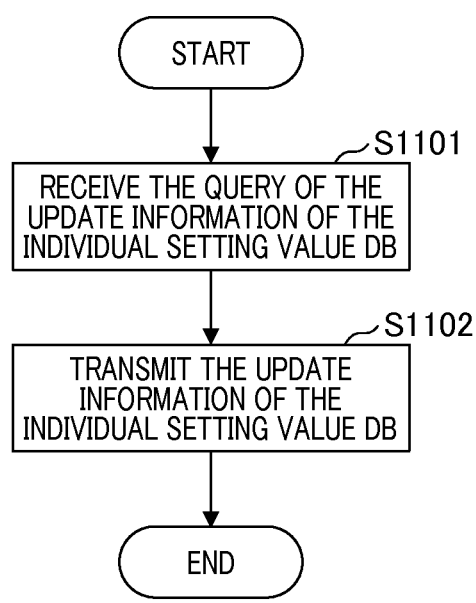
FIG. 11 is a flowchart illustrating processing performed when the management server receives a query about update information of the individual device setting value DB.

Next, FIG. 11 is a flowchart illustrating an example of a process performed when the management server 110 receives a query from the multifunction device 120 about the update information of the individual setting value DB 413. In the present invention, the CPU 203 of the management server 110 reads the program from the HDD 205 and deploys it to the RAM 204 to perform.

Firstly, in step S1101, the CPU 203 receives the query from the multifunction device 120 about the update information of the individual setting value DB 413. At this time, the CPU 203 also receives the information of the final modification date and time that the multifunction device 120 finally modified the change of the individual setting value DB 413 in the setting value DB 601. Next, in step S1102, the CPU 203 refers to the individual setting value DB 413 and transmits the changed value relating to all setting values that have been updated after the final modification date and time received in step S1101 to the multifunction device 120.

As described above, according to the present embodiment, only the setting value which is not synchronized between the plurality of multifunction devices can be changed in the master data on the management server 110 if the setting value in the multifunction device 120 is changed by the initialization processing. The setting value item managed as shared setting value between the plurality of multifunction devices in the master data by the management server 110 can be prevented from modifying and reflecting the master data. That is, in the initialization processing, unintentionally changing the shared setting value in the master data on the management server 110 without confirming the content can be prevented.

Second Embodiment

In the first embodiment, the processing when the multifunction device 120 receives the change of the setting value from the user has been described. Recently, the information processing apparatus including the multifunction device may identify each user by using the setting value of preference for each user when a plurality of users shares one device. For example, if a certain user usually uses monochrome printing and duplex printing, the user can perform the monochrome and duplex printing by pressing a button after logging in the device by setting value to the button in association with the setting value.

In the device, the setting value reflected and modified regardless of the user and the setting value available to only the certain user coexist. In the present embodiment, setting value can be managed efficiently between the management server and the multifunction device even in this case.

Figure 12:
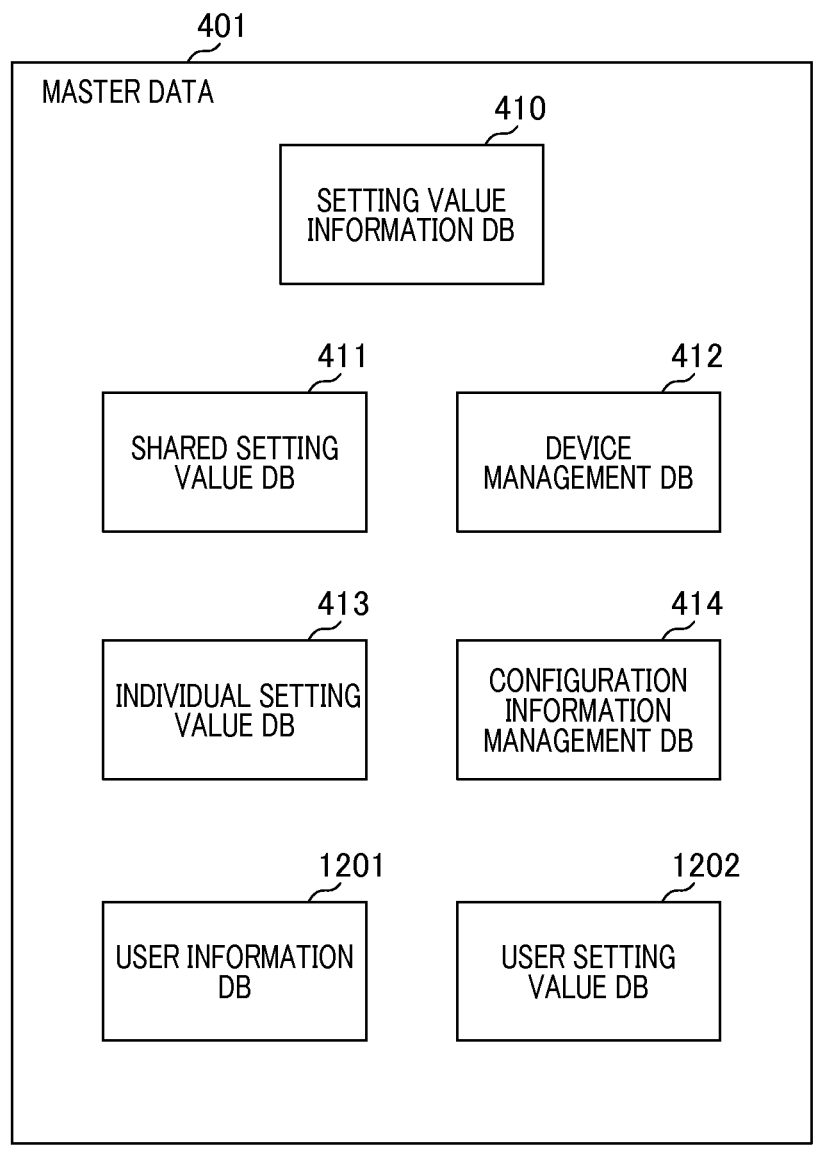
FIG. 12 is a block diagram illustrating the configuration of the master data managed by the management server.

FIG. 12 is a diagram illustrating the configuration of master data 401 according to the present embodiment. In the present embodiment, a user information DB 1201 and a user setting value DB 1202 are included in the master data 401 for managing the setting value for each user. FIG. 13A is a diagram illustrating data stored in the user information DB 1201. The user information DB 1201 is a database for managing information about the user that use the multifunction device 120. The user ID for uniquely identifying the user, the user name inputted by the user during login, and the like are stored in the user information DB 1201.

FIG. 13B is a diagram illustrating data stored in a user setting value DB 1202. The user setting value DB 1202 is a database for managing the setting value for each user available for the user that uses the multifunction device 120. The user ID for uniquely identifying the user, the key identifier for uniquely identifying the setting value, the content of the setting value, and the final update date and time of the setting value are stored in the user information DB 1201. Note that the user ID is the same system as that of the user information DB 1201.

Note that, in the present embodiment, a database similar to that of the user information DB 1201 or the user setting value DB 1202 is stored in the HDD 305 of the multifunction device 120 and is synchronized with the database on the management server 110. For the user setting value, a result of the processing must not be modified and reflected in the value of the user setting value DB 1202 on the management server 110 while performing the initialization processing. Note that the initialization processing for the user setting value is processing for receiving the selection of the user to delete the user setting value associated with the user. In the present embodiment, when the change of the setting value occurs, the management server 110 is not notified if the change is a change of the user setting value by the initialization processing.

Figure 14:
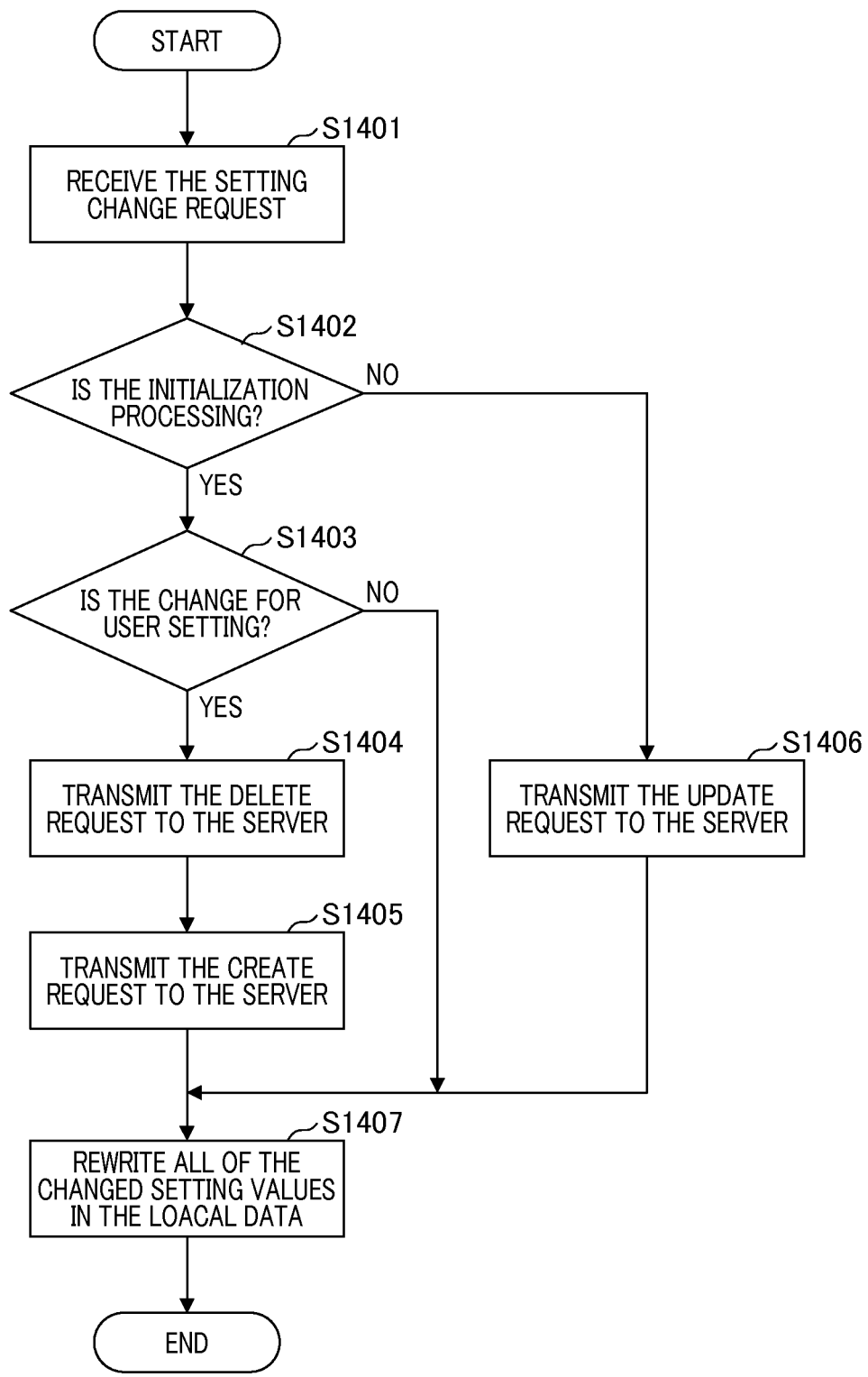
FIG. 14 is a flowchart illustrating the processing performed when the multifunction device receives the change request for a setting value.

FIG. 14 is a flowchart illustrating an example of the processing in which the multifunction device 120 detects the change of the individual setting value DB 413 by performing polling for the management server 110 and modifies and reflects it in the setting value DB 601. In the present embodiment, the CPU 302 reads the program from the HDD 305 and deploys it to the RAM 303 for execution.

Note that in the present embodiment, the processing in steps S1401 to S1402 is the same processing as that in steps S701 to S702 as described the above shown in FIG. 7 in first embodiment. Also, the processing in steps S1404 to S1407 is the same processing as that in steps S703 to S706 as described the above shown in FIG. 7 in first embodiment. Therefore, a detailed description thereof will be omitted.

In step S1402, if the change request is initialization processing (YES), the processing proceeds to step S1403. Then, the CPU 302 determines whether or not the target of the change request received in step S1401 is the user setting value. If the target is not the user setting value (NO), the processing proceeds to step S1404. If the target is the user setting value (YES), the processing proceeds to step S1407.

As described above, according to the present embodiment, if the category including the setting value according to the user setting value is present, the result of the initialization processing must not be modified and reflected in the user setting value DB 1202 on the management server 110 while performing the initialization processing on the multifunction device 120. That is, in the initialization processing, unintentionally changing the shared setting value in the master data on the management server 110 without confirming the content can be prevented.

Third Embodiment

In the first embodiment, the description in which the DELETE request and the CREATE request are transmitted continuously to the management server 110 if the initialization processing is performed by the multifunction device 120 has been made. However, in this case, it is not always necessary to transmit the DELETE request and the CREATE request separately, it is possible to transmit collectively one request. Therefore, in the present embodiment, a description will be given of the later processing.

Figure 15:
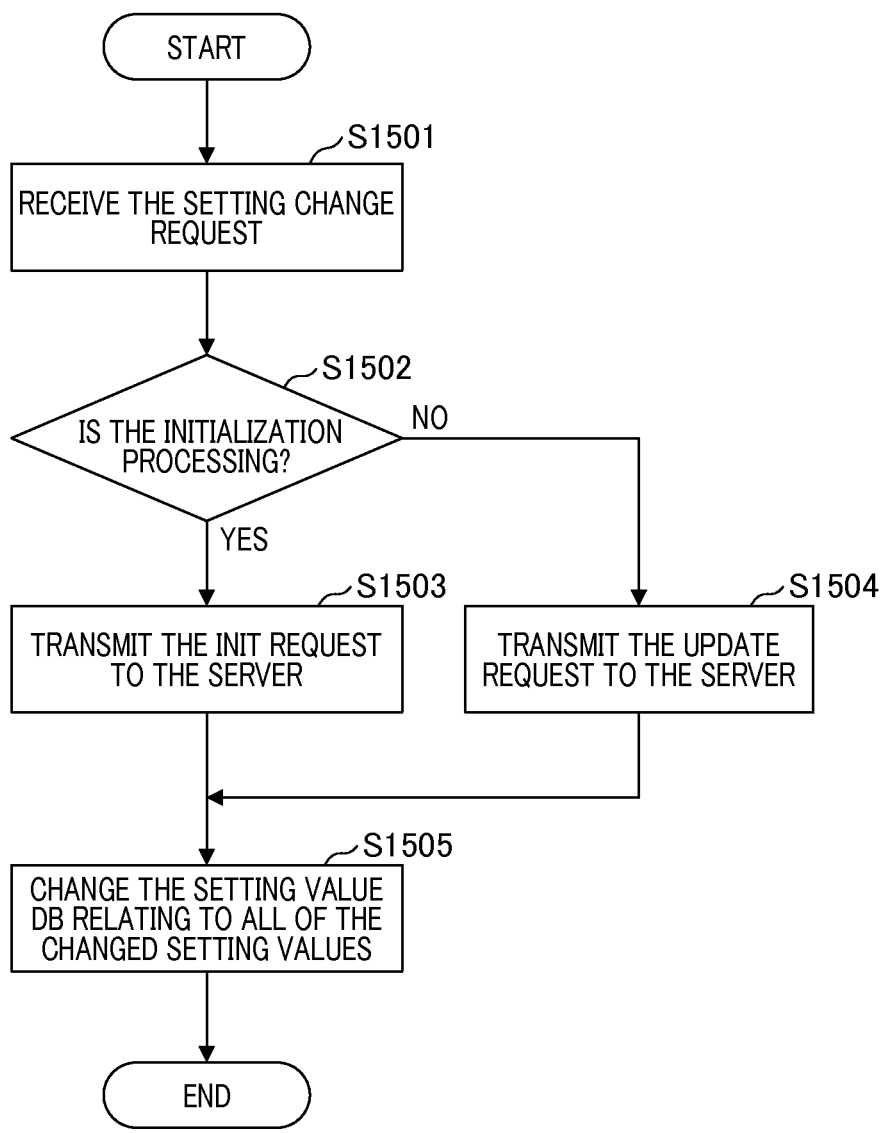
FIG. 15 is a flowchart illustrating the processing performed when the multifunction device receives the change request for a setting value.

FIG. 15 is a flowchart illustrating the processing performed by the multifunction device 120 when the user of the multifunction device 120 changes the setting value or performs the initialization processing for restoring the value of the certain setting value to the initial value stored in advance. The processing is performed by reading the program from the HDD 305 by the CPU of the multifunction device 120 and deploying it to the RAM 303 for execution. In the following description, a description of the parts overlapping with the processing as described in FIG. 7 in the first embodiment will be omitted.

The processing in steps S1501, S1502, S1504, and S1505 are the same processing in steps S701, S702, S705, and S706 as described the above shown in FIG. 7. In step S1503, the CPU 302 transmits an INIT request about the setting value to be initialized to the management server 110. As the method for transmitting the INIT request to the management server 110, a method for transmitting the request with, for example, HTTP (Hypertext Transfer Protocol) is considered. However, if the method is the method for transmitting in a communicable manner via the network, the method is not limited to a specific method.

Figure 16:
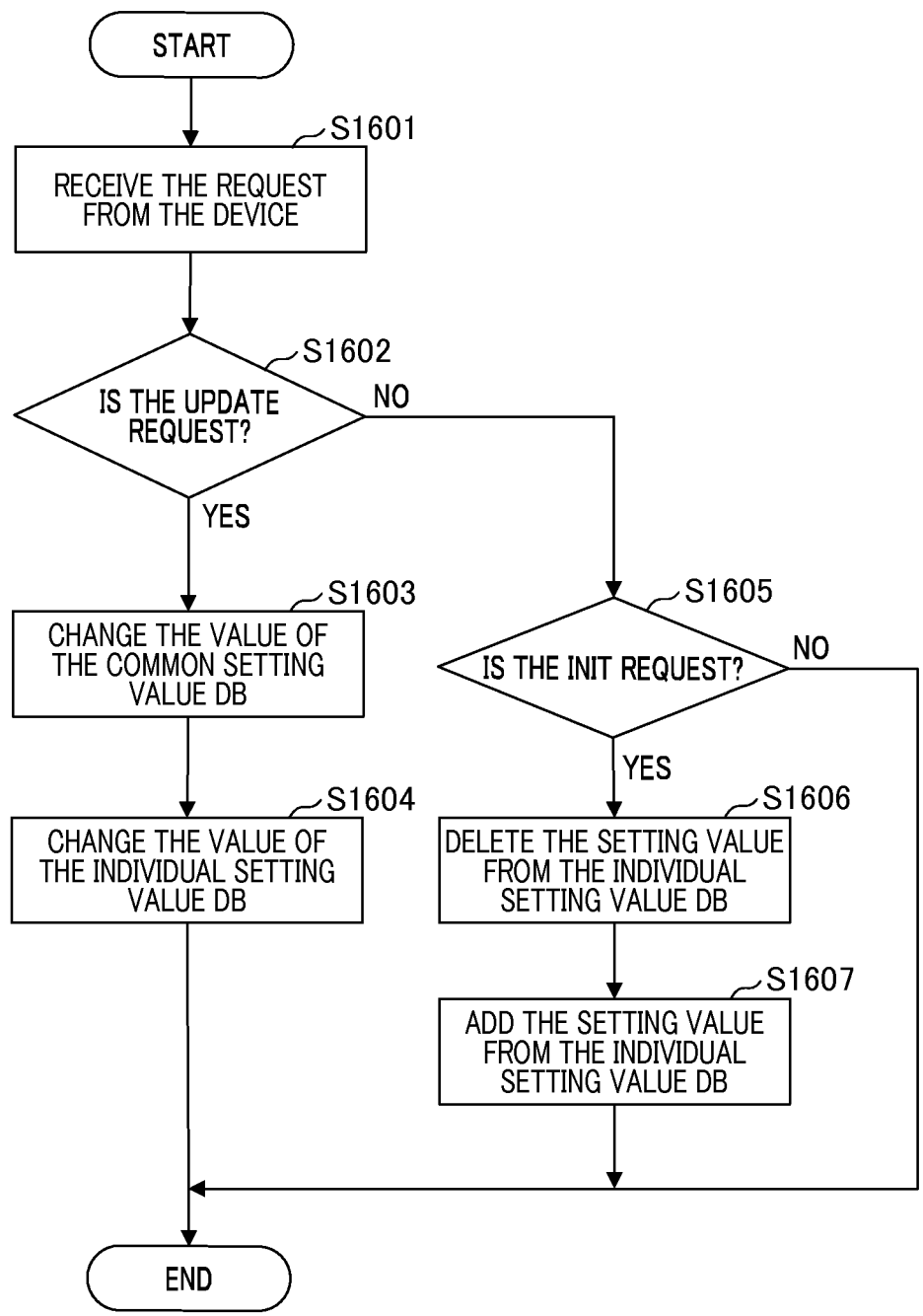
FIG. 16 is a flowchart illustrating the processing performed when the management server receives various requests.

Next, FIG. 16 is a flowchart illustrating an example in which the processing performed when the management server 110 receives various requests from the multifunction device 120. In the present embodiment, the CPU 203 of the management server 110 reads the program from the HDD 205 and deploys it to the RAM 204 for execution. In the following description, a description of the parts overlapping with the processing as described in FIG. 9 in the first embodiment will be omitted.

The processing in steps S1601 to S1604 is the same processing as in steps S901 to S904, as described the above shown in FIG. 9. In step S1605, the CPU 203 determines whether or not the request received in step S1601 is the INIT request. If the request is the INIT request (YES), the processing proceeds to step S1606. In contrast, if the request is not the INIT request (NO), the processing ends. Next, in step S1606, the CPU 203 deletes the setting value of the DELETE target from the individual setting value DB 413. Then, in step S1607, the CPU 203 adds the setting value of the CREATE target to the individual setting value DB 413.

As described above, according to the present embodiment, if the initialization processing is performed on the multifunction device 120, the INIT request may be transmitted one time, but it is not always necessary to transmit the DELETE request and the CREATE request as the separate requests twice. That is, in the initialization processing, unintentionally changing the shared setting value in the master data on the management server 110 without confirming the content can be prevented.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-270107, filed Dec. 26, 2013, and Japanese Patent Application No. 2014-209973 filed on Oct. 14, 2014, which are hereby incorporated by reference herein in their entirety.

What is claimed is:

1. An information processing apparatus comprising a central processing unit coupled to a memory, where the central processing unit is programmed to provide:
a managing unit configured to manage setting values of a plurality of network devices, wherein the setting values include a shared setting value to be set on the plurality of network devices and a unique setting value to be set on a single network device, where the unique setting value is a setting value unique to the single network;
an acquiring unit configured to acquire a request of an initialization for initializing at least a part of the setting value managed by the managing unit; and
an initializing unit configured to initialize the unique setting value managed by the managing unit without initializing the shared setting value managed by the managing unit if the request of the initialization is acquired.

2. The information processing apparatus according to claim 1, further comprising:
a changing unit configured to change the setting value if the acquiring unit acquires the request of the change for changing the setting value.

3. The information processing apparatus according to claim 2, wherein the changing unit changes the shared setting value and the unique setting value.

4. The information processing apparatus according to claim 1, wherein the initializing unit changes the unique setting value to an initial value without changing the shared setting value.

5. The information processing apparatus according to claim 1, wherein the managing unit manages the setting value identifiably whether it is the shared setting value or the unique setting value.

6. The information processing apparatus according to claim 1, wherein the acquiring unit is configured to acquire the request of the initialization in a case where the single network device initializes the unique setting value managed by the single network device.

7. The information processing apparatus according to claim 1, wherein, in a case where the unique setting value is initialized, the unique setting value becomes a predetermined value which has been stored in a storing unit in advance.

8. A method for controlling an information processing apparatus comprising:
managing, by a managing unit, setting values of a plurality of network devices, wherein the setting values include a shared setting value to be set on the plurality of network devices and a unique setting value to be set on a single network device, where the unique setting value is a setting value unique to the single network device;
changing the unique setting value managed by the managing unit to an initial value without changing the shared setting value if a request of initialization for initializing at least a part of the setting value managed by the managing unit is acquired; and
changing the shared setting value if a request for a change for changing the shared setting value has been obtained.

9. A non-transitory storage medium storing a readable program for causing a computer to execute a controlling method executed in an information processing apparatus, the method comprising:
managing, by a managing unit, setting values of a plurality of network devices, wherein the setting values include a shared setting value to be set on the plurality of network devices and a unique setting value to be set on a single network device, wherein the unique setting value is a setting value unique to the single network device;
changing the unique setting value managed by the managing unit to an initial value without changing the shared setting value if a request of initialization for initializing at least a part of the setting value managed by the managing unit is acquired; and
changing the shared setting value if a request for a change for changing the shared setting value has been obtained.

* * * * *